United States Patent [19]

Absil et al.

[11] Patent Number: 5,085,762
[45] Date of Patent: Feb. 4, 1992

[54] CATALYTIC CRACKING OF HYDROCARBONS

[75] Inventors: Robert P. L. Absil, Mantua; Emmerson Bowes, Hopewell, both of N.J.; Gary J. Green, Yardley, Pa.; David O. Marler, Deptford; David S. Shihabi, Pennington, both of N.J.; Richard F. Socha, Newtown, Pa.

[73] Assignee: Mobil Oil Corporation, Fairfax, Va.

[21] Appl. No.: 548,349

[22] Filed: Jul. 5, 1990

[51] Int. Cl.$^5$ .............................................. C10G 11/05
[52] U.S. Cl. ................... 208/120; 208/121; 208/149; 502/67; 423/239
[58] Field of Search .................. 208/120, 121, 149; 502/67; 423/239

[56] References Cited

U.S. PATENT DOCUMENTS

| | | | |
|---|---|---|---|
| 4,439,409 | 3/1984 | Puppe et al. | 502/60 |
| 4,826,667 | 5/1989 | Zones et al. | 423/277 |
| 4,954,325 | 9/1990 | Rubin et al. | 423/328 |
| 4,973,399 | 11/1990 | Green et al. | 208/149 |
| 4,980,052 | 12/1990 | Green et al. | 208/121 |

FOREIGN PATENT DOCUMENTS 231860 8/1987 European Pat. Off. .
293032 11/1988 European Pat. Off. .

Primary Examiner—Anthony McFarlane
Attorney, Agent, or Firm—Alexander J. McKillop; Charles J. Speciale; Malcolm D. Keen

[57] ABSTRACT

Emission of noxious nitrogen oxides with the flue gas from the regenerator of a fluid catalytic cracking plant are reduced by incorporating into the circulating inventory of cracking catalyst separate additive particles that contain a copper-loaded zeolite material having a characteristic structure with a defined X-ray diffraction pattern. The preferred material of this type is zeolite MCM-22. The copper may be exchanged onto the zeolite or impregnated into the catalyst. In addition, the catalyst may include titanium or zirconium to provide stability and further improvements in stability may be obtained with the addition of rareearth metal cations, especially cerium or yttrium. NOX and CO emissions from the regenerator are reduced, and the gasoline produced in the unit may have an improved octane number.

14 Claims, No Drawings

CATALYTIC CRACKING OF HYDROCARBONS

CROSS REFERENCE TO RELATED APPLICATIONS

This application is related to Ser. No. 07/433,407, filed 3 Nov. 1989, now U.S. Pat. No. 4,980,052, entitled Catalytic Cracking of Hydrocarbons. It is also related to Ser. No. 07/454,475, filed 21 Dec. 1989, now U.S. Pat. No. 4,973,399, entitled Catalytic Cracking of Hydrocarbons.

FIELD OF THE INVENTION

This invention relates to the catalytic cracking of hydrocarbons. It more particularly refers to a cracking catalyst composition that produces a flue gas with ecologically acceptable concentration of carbon monoxide and nitrogen oxides.

BACKGROUND OF THE INVENTION

In recent years there has been an increased concern in the United States and elsewhere about air pollution from industrial emissions of noxious oxides of nitrogen, sulfur and carbon. Government agencies, in response to such concerns, have in some cases already placed limits on allowable emissions of one or more of the pollutants, and the trend is clearly in the direction of increasingly stringent restrictions. Petroleum fuel refineries are particularly affected by present and anticipated restrictions on emissions, particularly emissions of nitrogen oxides and carbon monoxide. Catalytic cracking, a major petroleum refinery process, is usually the largest single source of nitrogen oxides in refineries.

The catalytic cracking of petroleum hydrocarbons to lower molecular weight products by the fluid catalytic cracking (FCC) or moving bed (TCC) processes is carried out on a large scale in petroleum refineries. In the FCC process, the cracking is carried out in a cyclic mode in which a heavy hydrocarbon feedstock such as a gas oil is contacted with hot, active, solid particulate catalyst in the absence of added hydrogen at rather low pressures of up to about 50 psig and temperatures sufficient to support the desired endothermic cracking reactions. The FCC catalyst is a fine powder of about 10 to 200 microns, preferably about 70 micron size. As the hydrocarbon feed is cracked to more valuable and desirable products, "coke" is deposited on the catalyst particles and in the course of this process, a large portion of the organic nitrogen in the feed becomes incorporated into the coke deposit. The coked catalyst particles are disengaged from the hydrocarbon products and regenerated by contact with an oxygen-containing gas in a regenerator so that the coke is burned away from the particles to restore their catalytic activity and selectivity. The heated, regenerated catalyst particles are then returned to the cracking zone and contacted with additional hydrocarbon feed and the cycle is repeated. The phrase "circulating inventory of cracking catalyst" as used here includes the total catalyst contained in the cracking unit, including the cracking and regenerator sections of the cracking plant, as well as the associated equipment including transfer lines, standpipes and the like.

Although most petroleum cracking is conducted by the fluid (FCC) process, non-fluid catalyst beds also may be used. Processes operated continuously and in cyclic fashion, with movement of the catalyst against gravity being effected, as needed, pneumatically or mechanically. One typical example of industrially practiced moving bed hydrocarbon catalytic cracking is known as Thermofor Catalytic Cracking (TCC). In this process the catalyst is in the shape of beads or pellets having an average particle size of about 1/64 to ¼ inch, preferably about ⅛ inch. Although the present invention is described here for simplicity in terms of fluid catalytic cracking, the invention encompasses both fluid and moving-bed type processes.

In general, when the catalyst is regenerated by burning off the coke deposits with a deficiency of oxygen, the regenerator flue gas has a high $CO/CO_2$ ratio and a low level of nitrogen oxides, but when burned with excess oxygen, the flue gas has a high level of such nitrogen oxides and a reduced CO content. Thus, catalytic cracking regenerators emit CO, or nitrogen oxides, or mixtures of these pollutants with the flue gas in varying quantities, depending mainly on feed quality and mode of operation of the regenerator as well as on the design of the unit.

When incomplete combustion of coke in the regenerator of a fluid catalytic cracking plant leaves a significant amount of carbon monoxide (CO) in the flue gas, not only is the CO released to the atmosphere, but it also tends to sporadically burn (by reaction of CO with residual oxygen) in the regenerator vessel and in the ducts and flues of the plant (afterburning), often damaging these structures by the excessive temperatures arising from the highly exothermic combustion of the carbon monoxide. Trace amounts of a platinum group metal, such as 1.0 parts per million of platinum incorporated with the cracking catalyst, are capable of effectively catalyzing the complete burning of carbon monoxide to carbon dioxide in the regenerator without detriment to the cracking reaction. This development simultaneously eliminated the environmental problem and the problem of sporadic afterburning, and has been very widely accepted by refiners. Such catalysts and their use are described in the Schwartz U.S. Pat. Nos. 4,251,395, 4,265,787, 4,088,568, 4,072,600, 4,093,535 and 4,159,239, to which reference is made for a description of these catalysts and their use in cracking operations. As described in those patents, the promoted catalysts may be used to burn the CO completely (referred to in this specification as "full CO-combustion") or only partially (referred to in this specification as "partial CO-combustion") by the simple expedient of limiting the oxygen supplied to the regenerator. The term "Pt group metal CO-oxidation promoter" as used in this specification means those metals and their mode of use, as taught, for example, by the Schwartz patents cited above. Operation with CO-combustion promoters, which solves the CO emissions problem, can in some instances increase the $NO_x$ emissions.

Although several nitrogen oxides are known which are relatively stable at ambient conditions, the nitric oxide and nitrogen dioxide which may be formed in the regenerator under appropriate conditions, are interconvertible according to the equation:

$$2NO + O_2 = 2NO_2.$$

In the present specification, $NO_x$ will be used herein to represent nitric oxide, nitrogen dioxide (the principal noxious oxides of nitrogen), as well as mixtures containing these gases.

It is generally recognized that two of these, viz. nitric oxide (NO) and nitrogen dioxide $NO_2$), are the principal contributors to smog and other undesirable environmental effects when they are discharged into the atmosphere. Because of this, various proposals have been made for reducing the emission of nitrogen oxides from catalytic cracking units.

U.S. Pat. No. 3,900,554 (Lyon) describes a homogeneous gas phase thermal reaction to remove $NO_x$ from combustion effluent by adding 0.4 to 10 moles (preferably 0.5 to 1.5 moles) of ammonia followed by heating to 1600/C. to 2000/C. The $NO_x$ content is lowered as a result of its being reduced to nitrogen by reaction with ammonia. The so-called "selective catalytic reduction" type process which operates at a much lower temperature, 200/ to 600/C., is exemplified by U.S. Pat. No. 4,220,632 (Pence), which describes a process for reducing $NO_x$ from a fossil fuel fired power generation plant, or from other industrial plant off- gas stream, to elemental nitrogen and/or innocuous nitrogen oxides by employing ammonia as reductant and, as catalyst, the hydrogen or sodium form of a zeolite having pore openings of about 3 to 10 Å.

In application Ser. No. 07,433,407, we have described a method for reducing $NO_x$ emissions formed in cracking catalyst regeneration without resorting to the very high temperatures required for the gas phase thermal reaction with $NH_3$, without the addition of ammonia, and without the necessity of providing expensive downstream facilities to clean up the flue gas. According to application Ser. No. 07,433,407, the reduction in $NO_x$ in the regeneration flue gases is effected by incorporating into the circulating catalyst inventory of the catalytic cracking unit an amount of additive particles comprising a highly siliceous crystalline zeolite containing copper metal or ions preferably in an amount equivalent to at least one half mole of CuO for each mole of $Al_2O_3$ in said zeolite. The amount of additive particles constite 0.1 to 30 wt%, and preferably 0.1 to 10 wt% of the circulating inventory including additive and the zeolite preferably has the crystal structure of ZSM-5, ZSM-11, ZSM-12, ZSM-22, ZSM-23, ZSM-35, ZSM-38, ZSM-48, mordenite, dealuminated Y or Zeolite Beta. The preferred zeolites have a silica:alumina ratio of 20 to 100.

The advantage of the method of the invention described in Ser. No. 07,433,407 is its simplicity: no modification of the catalytic cracking equipment is required, nor is there any necessity for expensive downstream facilities for the downstream treatment of the flue gas, either to reduce NOX or carbon monoxide emissions. A further advantage of the process is that the octane of the product gasoline may be improved by the use of the preferred additive catalysts.

SUMMARY OF THE INVENTION

We have now found a novel class of additive catalysts which are effective for the reduction of NOX and carbon monoxide emissions from catalytic cracking units. These additive catalysts may be used in the same way as described in Ser. No. 07,433,407, that is, they are used in combination with a cracking catalyst such as zeolite Y, especially ultrastable zeolite Y (USY), and circulate with the cracking catalyst in the unit.

According to the present invention, the additive catalyst which is used to reduce the CO and NOX emissions is a synthetic, porous crystalline zeolite material which is characterized by a specific X-ray diffraction pattern. The zeolite catalyst is used in a form which includes copper and, for improved stability, rare earth components such as cerium, and titanium.

The porous crystalline material is characterized, in general terms, by an X-ray diffraction pattern including interplanar d-spacings at 12.36±0.4, 11.03±0.2, 8.83±0.14, 6.18±0.12, 6.00±0.10, 4.06±0.07, 3.91±0.07 and 3.42±0.06 Å. The preferred zeolite of this type is the material described below and identified as MCM-22.

The catalyst composition may be prepared in situ by adding the additive component of the catalyst to the cracking unit or, alternatively, by adding a preformed mixture of conventional cracking catalyst and the additive comprising the crystalline material and the copper component.

DETAILED DESCRIPTION

The cracking catalyst composition of this invention consists of 99.9 to 70.0 wt% of a solid acidic cracking catalyst or host catalyst, and 0.1 to 30.0 wt% of additive catalyst. A preferred range for the host catalyst is 99.9 to 90.0 wt% with 0.1 to 10.0 wt% of the additive. The additive is preferably present in the form of separate particles i.e. as discrete particles of the zeolite catalyst containing the copper, separate from the host catalyst.

Cracking Catalyst

As cracking catalyst, any solid acidic cracking catalyst free of added copper may be used, including amorphous catalysts such as those based on silica alumina and silica magnesia, for example. The term "added copper" means copper deliberately added by impregnation or ion-exchange, and excludes copper which may be acquired from trace amounts in the feed, for example.

The preferred cracking catalyst is one prepared, for example, by compositing a major portion of amorphous matrix material with a minor portion of an active crystalline aluminosilicate zeolite. Catalysts of this type for FCC and TCC are described in U.S. Pat. Nos. 3,140,249 and 3,140,253. The active crystalline aluminosilicate component of such catalysts, usually a large pore zeolite of the faujasite crystal type, imparts high activity with very good selectivity to the cracking catalyst. Such catalysts have become very widely used in fluid catalytic cracking, supplanting the older amorphous synthetic silica-alumina catalysts almost completely. The term "zeolite cracking catalyst" as used herein means a catalyst essentially of the type described in U.S. Pat. Nos. 3,140,249 and 3,140,253, and variants thereof, such as those which also include a ZSM-5 type zeolite, exemplified by U.S. Pat. Nos. 3,758,403; 4,309,279; and 4,309,280, to which reference is made for a detailed description of such catalysts. A preferred cracking catalyst component is the synthwetic faujasite, zeolite Y, of which a preferred form is the so-called "ultrastable" form or "USY", which is widely available commercially.

Additive Catalyst

Crystalline Base Material

The additive employed with the cracking catalyst is characterized by a specific X-ray diffraction pattern as discussed below. In its calcined from, the synthetic crystalline porous material employed in the catalyst is characterized by an X-ray diffraction pattern including the lines shown in Table 1 below:

TABLE 1

| Interplanar d-Spacing (A) | Relative Intensity, $I/I_o \times 100$ |
| --- | --- |
| 12.36 ± 0.4 | M-VS |
| 11.03 ± 0.2 | M-S |
| 8.83 ± 0.14 | M-VS |
| 6.18 ± 0.12 | M-VS |
| 6.00 ± 0.10 | W-M |
| 4.06 ± 0.07 | W-S |
| 3.91 ± 0.07 | M-VS |
| 3.42 ± 0.06 | VS |

Alternatively, it may be characterized by an X-ray diffraction pattern in its calcined form including the following lines shown in Table 2 below:

TABLE 2

| Interplanar d-Spacing (A) | Relative Intensity, $I/I_o \times 100$ |
| --- | --- |
| 30.0 ± 2.2 | W-M |
| 22.1 ± 1.3 | W |
| 12.36 ± 0.4 | M-VS |
| 11.03 ± 0.2 | M-S |
| 8.83 ± 0.14 | M-VS |
| 6.18 ± 0.12 | M-VS |
| 6.00 ± 0.10 | W-M |
| 4.06 ± 0.07 | W-S |
| 3.91 ± 0.07 | M-VS |
| 3.42 ± 0.06 | VS |

More specifically, the calcined form may be characterized by an X-ray diffraction pattern including the following lines shown in Table 3 below:

TABLE 3

| Interplanar d-Spacing (A) | Relative Intensity, $I/I_o \times 100$ |
| --- | --- |
| 12.36 ± 0.4 | M-VS |
| 11.03 ± 0.2 | M-S |
| 8.83 ± 0.14 | M-VS |
| 6.86 ± 0.14 | W-M |
| 6.18 ± 0.12 | M-VS |
| 6.00 ± 0.10 | W-M |
| 5.54 ± 0.10 | W-M |
| 4.92 ± 0.09 | W |
| 4.64 ± 0.08 | W |
| 4.41 ± 0.08 | W-M |
| 4.25 ± 0.08 | W |
| 4.10 ± 0.07 | W-S |
| 4.06 ± 0.07 | W-S |
| 3.91 ± 0.07 | M-VS |
| 3.75 ± 0.06 | W-M |
| 3.56 ± 0.06 | W-M |
| 3.42 ± 0.06 | VS |
| 3.30 ± 0.05 | W-M |
| 3.20 ± 0.05 | W-M |
| 3.14 ± 0.05 | W-M |
| 3.07 ± 0.05 | W |
| 2.99 ± 0.05 | W |
| 2.82 ± 0.05 | W |
| 2.78 ± 0.05 | W |
| 2.68 ± 0.05 | W |
| 2.59 ± 0.05 | W |

Most specifically, it may be characterized in its calcined form by an X-ray diffraction pattern including the following lines shown in Table 4 below:

TABLE 4

| Interplanar d-Spacing (A) | Relative Intensity, $I/I_o \times 100$ |
| --- | --- |
| 30.0 ± 2.2 | W-M |
| 22.1 ± 1.3 | W |
| 12.36 ± 0.4 | M-VS |
| 11.03 ± 0.2 | M-S |
| 8.86 ± 0.14 | M-VS |
| 6.86 ± 0.14 | W-M |
| 6.18 ± 0.12 | M-VS |
| 6.00 ± 0.10 | W-M |
| 5.54 ± 0.10 | W-M |

TABLE 4-continued

| Interplanar d-Spacing (A) | Relative Intensity, $I/I_o \times 100$ |
| --- | --- |
| 4.92 ± 0.09 | W |
| 4.64 ± 0.08 | W |
| 4.41 ± 0.08 | W-M |
| 4.25 ± 0.08 | W |
| 4.10 ± 0.07 | W-S |
| 4.06 ± 0.07 | W-S |
| 3.91 ± 0.07 | M-VS |
| 3.75 ± 0.05 | W-M |
| 3.56 ± 0.06 | W-M |
| 3.42 ± 0.06 | VS |
| 3.30 ± 0.05 | W-M |
| 3.20 ± 0.05 | W-M |
| 3.14 ± 0.05 | W-M |
| 3.07 ± 0.05 | W |
| 2.99 ± 0.05 | W |
| 2.82 ± 0.05 | W |
| 2.78 ± 0.05 | W |
| 2.68 ± 0.05 | W |
| 2.59 ± 0.05 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the diffractometer. From these, the relative intensites, 100 $I/I_o$, where $I_o$ is the intensity of the strongest line or peak, and d (obs.) the interplanar spacing in Angstrom Units (Å), corresponding to the recorded lines, were determined. In Tables 1-4, the relative intensities are given in terms of the symbols W=weak, M=medium, S=strong, VS=very strong. In terms of intensities, these may be generally designated as folows:

| | |
| --- | --- |
| W = | 0-20 |
| M = | 20-40 |
| S = | 40-60 |
| VS = | 60-100 |

These X-ray diffraction patterns are characteristic of all species of the zeolite. The sodium form as well as other cationic forms reveal substantially the same pattern with some minor shifts in interplanar spacing and variation in relative intensity. Other minor variations can occur depending on the ratio of structural components, e.g. silicon to aluminum mole ratio of the particular sample, as well as its degree of thermal treatment.

Examples of such porous crystalline materials include the PSH-3 composition of U.S. Pat. No. 4,439,409, to which reference is made for a description of this material as well as of its preparation. Another crystalline material of this type is the synthetic zeolite MCM-22.

Zeolite MCM-22 has a chemical composition expressed by the molar relationship:

$$X_2O_3:(n)YO_2,$$

where X is a trivalent element, such as aluminum, boron, iron and/or gallium, preferably aluminum, Y is a tetravalent element such as silicon and/or germanium, preferably silicon, and n is at least about 10, usually from about 10 to about 150, more usually from about 10 to about 60, and even more usually from about 20 to about 40. In the as-synthesized form, zeolite MCM-22 has a formula, on an anhydrous basis and in terms of moles of oxides per n moles of $YO_2$, as follows:

$(0.005-0.1)Na_2O:(1-4)R:X_2O_3:nYO_2$ where R is an organic component. The Na and R components are associated with the zeolite as a result of their presence during crystallization, and are easily removed by the post-crystallization methods described below.

Zeolite MCM-22 is thermally stable and exhibits a high surface area greater than about 400 m²/gm as measured by the BET (Bruenauer, Emmet and Teller) test and unusually large sorption capacity when compared to previously described crystal structures having similar X-ray diffraction patterns. As is evident from the above formula, MCM-22 is synthesized nearly free of Na cations and thus possesses acid catalysis activity as synthesized. It can, therefore, be used as a component of the alkylation catalyst composition herein without having to first undergo an exchange step. To the extent desired, however, the original sodium cations of the as-synthesized material can be replaced at least in part by established techniques including ion exchange with other cations. Preferred replacement cations include metal ions, hydrogen ions, hydrogen precursor ions, e.g., ammonium and mixtures of such ions.

In its calcined form, zeolite MCM-22 appears to be made up of a single crystal phase with little or no detectable impurity crystal phases and has an X-ray diffraction pattern including the lines listed in above Tables 1-4.

Prior to its use as an additive catalyst, the zeolite crystals should be subjected to thermal treatment to remove part or all of any organic constituent present in the as-synthesised material.

The zeolite in its as-synthesised form containing organic cations as well as when it is in its ammonium form, can be converted to another form by thermal treatment. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience. The thermal treatment can be performed at a temperature of up to a limit imposed by the irreversible thermal degradation of the crystalline structure of the zeolite, typically up to about 925° C.

Prior to its use in the preparation of the additive catalyst, the zeolite crystals should be dehydrated, at least partially. This can be done by heating the crystals to a temperature in the range of from about 200° C. to about 595° C. in an atmosphere such as air, nitrogen, etc. and at atmospheric, subatmospheric or superatmospheric pressures for between about 30 minutes to about 48 hours. Dehydration can also be performed at room temperature merely by placing the crystalline material in a vacuum, but a longer time is required to obtain a sufficient amount of dehydration.

Zeolite MCM-22 can be prepared from a reaction mixture containing sources of alkali or alkaline earth metal (M), e.g., sodium or potassium, cation, an oxide of trivalent element X, e.g, aluminum, an oxide of tetravalent element Y, e.g., silicon, an organic (R) directing agent, described below, and water. The reaction mixture has a composition, in terms of mole ratios of oxides, within the following ranges:

| Reactants | Useful | Preferred |
|---|---|---|
| $YO_2/X_2O_3$ | 10-60 | 10-40 |
| $H_2O/YO_2$ | 5-100 | 10-50 |
| $OH^-/YO_2$ | 0.01-1.0 | 0.1-0.5 |
| $M/YO_2$ | 0.01-2.0 | 0.1-1.0 |
| $R/YO_2$ | 0.05-1.0 | 0.1-0.5 |

The organic directing agent for use in synthesizing zeolite MCM-22 from the above reaction mixture is hexamethyleneimine.

In a preferred method of synthesizing zeolite MCM-22, the $YO_2$ reactant contains a substantial amount of solid $YO_2$, e.g., at least about 30 wt.% solid $YO_2$. Where $YO_2$ is silica, the use of a silica source containing at least about 30 wt.% soid silica, e.g., Ultrasil (a precipitated, spray dried silica containing about 90 wt.% silica) or HiSil (a precipitated hydrated $SiO_2$ containing about 87 wt.% silica, about 6 wt.% free $H_2O$ and about 4.5 wt.% bound $H_2O$ of hydration and having a particle size of about 0.02 micron) favors crystal formation from the above mixture and is a distinct improvement over the synthesis method disclosed in U.S. Pat. No. 4,439,409. If another source of oxide of silicon, e.g., Q-Brand (a solidum silicate comprised of about 28.8 wt.% of $SiO_2$, 8.9 wt.% $Na_2O$ and 62.3 wt.% $H_2O$) is used, crystallization may yield little if any MCM-22 crystalline material and impurity phases of other crystal structures, e.g., ZSM-12, may be produced. Preferably, therefore, the $YO_2$, e.g., silica, source contains at least about 30 wt.% solid $YO_2$, e.g., silica, and more preferably at least about 40 wt.% solid $YO_2$, e.g., silica.

Crystallization of the MCM-22 crystalline material can be carried out at either static or stirred conditions in a suitable reactor vessel such as, e.g., polypropylene jars or teflon-lined or stainless steel autoclaves. The total useful range of temperatures for crystallization is from about 80° C. to about 225° C. for a time sufficient for crystallization to occur at the temperature used, e.g., from about 25 hours to about 60 days, after which the crystals ar separated from the liquid and recovered.

The reaction mixture components can be supplied by more than one source. The reaction mixture can be prepared either batchwise or continuously. Crystal size and crystallization time of the MCM-22 crystalline material will vary with the nature of the reaction mixture employed and the crystallization conditions.

In all cases, synthesis of the MCM-22 crystals is facilitated by the presence of at least about 0.01 percent, preferably about 0.10 percent and still more preferably about 1 percent, seed crystals (based on total weight) of the crystalline product.

The stability of the catalyst may be increased by steaming. U.S. Pat. Nos. 4,663,492; 4,594,146; 4,522,929; and 4,429,176, describe conditions for the steam stabilization of zeolite catalysts which can be utilized to steam-stabilize the catalyst. Reference is made to these patents for a detailed description of the steam stabilization technique for use with the present catalysys. The steam stabilization conditions typically include contacting the catalyst with, e.g., 5-100% steam at a temperature of at least about 300° C. (e.g., 300°-650° C.) for at least one hour (e.g., 1-200 hours) at a pressure of 101-2,500 kPa. In a more particular embodiment, the catalyst can be made to undergo steaming with 75-100% steam at 315°-500° C. and atmospheric pressure for 2-25 hours. The steaming of the catalyst can take place under conditions sufficient to initially increase the Alpha Value of the catalyst, the significance of which is discussed below, and produce a steamed catalyst having an enhanced Alpha Value. If desired, steaming can be continued to subsequently reduce the Alpha Value from the higher Alpha Value to an Alpha Value which is substantially the same as the Alpha Value of the unsteamed catalyst.

The preparation of various MCM-22 catalytic materials is described in detail in Examples 1 to 8 below. In these Examples illustrating the synthesis of zeolite, sorption data for water, cyclohexane and/or n-hexane adsorption were Equilibrium Adsorption values determined as follows:

A weighed sample of the calcined adsorbent was contacted with the desired pure adsorbate vapor in an adsorption chamber, evacuated to less than 1 mm Hg and contacted with 12 Torr of water vapor or 40 Torr of n-hexane or 40 Torr cyclohexane vapor, pressures less than the vapor-liquid equilibrium pressure of the respective adsorbate at 90° C. The pressure was kept constant (within about ±0.5 mm Hg) by addition of adsorbate vapor controlled by a manostat during the adsorption period, which did not exceed about 8 hours. As adsorbate was adsorbed by the crystalline material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant. Zeolite MCM-22 always exhibits Equilibrium Adsorption values of greater than about 10 wt.% for water vapor, greater than about 4.5 wt.%, usually greater than about 7 wt.% for cyclohexane vapor and greater than about 10 wt.% for n-hexane vapor. These vapor sorption capacities are a notable distinguishing feature of zeolite MCM-22 and are preferred for the zeolite component of catalyst for use herein.

The Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec $^{-1}$). The Alpha Test is described in U.S. Pat. No. 3,354,078, in the Journal of Catalysis. Vol. 4, p. 527 (1965); Vol. 6, p. 278 (1966); and Vol. 61, p. 395 (1980), to which reference is made for that description. The experimental conditions of the test reported here include a constant temperature of 538° C. and a variable flow rate as described in detail in the Journal of Catalysis. Vol. 61, p. 395.

Preparation of Additive Catalyst

For purposes of preparing the additive catalyst, the crystalline material may be used as such or, alternatively, may be incorporated in a binder (matrix) such as silica, silica-alumina, alumina, clay or other known inorganic binder, and used in this form as the starting material for the formulation of the additive catalyst. Regardless of whether the zeolite is in pure form or incorporated in a matrix, it is preferred that it be in the hydrogen, ammonium, or sodium form prior to loading with metals as described below. If in a matrix, it is bound and shaped to match the particle size and approximate density of the cracking catalyst.

The crystalline material is preferably composited with another material which is resistant to the temperatures and other conditions encountered in the cracking process and to improve the crush strength of the catalyst under these conditions. These materials function as binders or matrices for the catalyst. Such materials typically include active and inactive materials and synthetic or naturally occurring zeolites as well as inorganic materials such as clays and/or oxides such as alumina, silica or silica-alumina. The latter may be either naturally occurring or in the form of gelatinous precipitates or gels including mixtures of silica and metal oxides. Use of a material in conjunction with the zeolite, i.e., combined with it or present during its synthesis, which itself is catalytically active may change the conversion and/or selectivity of the catalyst. Inactive materials suitably serve as diluents to control the amount of conversion. The relative proportions of finely divided crystalline material and matrix may vary widely, with the crystal content ranging from about 1 to about 90 percent by weight and more usually, particularly when the composite is prepared in the form of beads, in the range of about 2 to about 80 weight percent of the composite.

The zeolite crystals can be composited into a wide variety of particle shapes and sizes for the finished catalyst. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

Copper and Stabilizinq Components

Copper may be introduced into the crystalline material by the use of any soluble copper salt, preferably one which provides cupric ions. We have found cupric acetate and cupric nitrate to be useful for this purpose, but cupric chloride and cupric sulfate also may be used. Ion-exchange techniques, as shown in the examples, provide catalytically effective copper. However, as will be illustrated by example below, effective loading is also obtained when the copper is introduced by impregnation of the zeolite with an aqueous solution of the copper salt. The amount of copper is generally in the range of 1 to 10 percent by weight of the additive catalyst, more usually in the range of about 2 to 5 weight percent, based on the entire weight of the additive catalyst.

In a preferred embodiment for making the additive catalyst, a steam stabilizing amount of titanium or zirconium cations or a mixture of these metal compounds is included in the additive by treatment of the zeolite with any titanium or zirconium compound that can be brought into intimate association with the zeolite. We have found that highly effective results are obtained with the use of aqueous solutions of titanium tetramethoxide and zirconium acetate, and, such materials being readily available, are preferred. The introduction of titanium or zirconium compound is effective when done by impregnation of the zeolite. The introduction of titanium or zirconium may follow ion-exchange by cupric ion, but it also may be done concurrently therewith with an aqueous solution containing, for example, both divalent copper cations and a soluble titanium or soluble zirconium compound. It is also possible to load the zeolite with titanium or zirconium compound prior to introduction of copper. An amount of the stabilizing metal equal to 1 to 20 weight percent, more usually from about 2 to 10 weight percent, of the total additive is effective.

In general, it is preferred to add the copper by impregnation of the matrix-bound zeolite with an aqueous solution containing the copper ions. This step may be followed by drying and calcining at about 500° C. for about 1-10 hours. Alternative procedures may be evaluated by simple testing, and used if advantageous.

In the particularly preferred embodiment of this invention, the crystalline material is combined with a matrix or binder consisting predominantly of a source of titania, a source of zirconia, or a mixture of the two, and shaped to provide particles of about the same size as the cracking catalyst. Suitable sources of titania include, for example, titanium dioxide (e.g. Anatase), hydrated titanium dioxide, and metatitanic acid. The zeolite may be mulled with the titania, zirconia or a precursor of either (or both) which is converted to the oxide during the subsequent processing e.g. during calcination, followed by extrusion or spray-drying. The resultant shaped particles may then be calcined to provide a composition containing about 10 to 90 parts of zeolite and 90 to 10 parts by weight of titania or zirconia matrix. Other means for preparing the zeolite in a titania matrix are disclosed in U.S. Pat. No. 4,793,813 to Kato et al., to which reference is made for a disclosure of these techniques. The calcined shaped particles are then treated by ion- exchange or impregnation with a source of copper ions and rare earth ions, these preferably being in aqueous solution as the chloride, nitrate or acetate salts, followed by calcination to prepare the catalyst additive.

The additive catalyst may be stabilized by the addition of one or more rare earth compounds, preferably derived from cerium or yttrium, although a wide variety of rare earth compounds can be employed as a source of rare earth ions. Operable compounds include rare earth chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malanates, oxalates, palmitates, hydroxides, tartrates, and the like. The only limitation on the particular rare earth metal salt or salts employed is that it be sufficiently soluble in the fluid medium in which it is used to enter the catalyst, preferably by a process of ion transfer although impregnation is also suitable. The preferred rare earth salts are chlorides, nitrates and sulfates.

Representative of the rare earth metals are cerium, lanthanum, praseodymium, neodymium, illinium, samarium, europium, gadolinium, terbium, dysprosium, holmium, erbium, thulium, scandium, yttrium, and lutecium.

The rare earth metal salts employed can either be the salt of a single rare earth metal or mixtures of rare earth metals, such as rare earth chlorides of didymium chlorides. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available. One such solution contains the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45-56% by weight, cerium 1-2% by weight, praseodymium 9-10% by weight, neodymium 32-33% by weight, samarium 5-7% by weight, gadolinium 3-4% by weight, yttrium 0.4% by weight, and other rare earths 1-2% by weight. Other mixtures of rare earths are also applicable for the preparation of the additive catalyst, although lanthanum, neodymium, praseodymium, samarium and gadolinium as well as mixtures of rare earth cations containing a predominant amount of one or more of the above cations are preferred.

In general, the amount of rare earth, calculated as the metal, will be from about 0.1 to 10.0, preferably from about 1 to about 10 weight percent of the total additive, to provide a significant and measurable increase in steam stability without substantial loss of catalytic activity of the unsteamed sample. Although it is difficult to specify the exact rare earth content needed for the desired effect, a few simple laboratory tests can determine said amount regardless of the zeolite chosen, or of the particular rare earth or mixture thereof used.

The rare earth stabilizers are preferably added in the same way as the copper, that is, by impregnation of the matrix-bound zeolite with an aqueous solution containing the rare earth ions, preferably simultaneously with the copper ions. This step may be followed by drying and calcining at about 500° C. for about 1-10 hours. Alternative procedures may be evaluated by simple testing, and used if advantageous.

As a final step in preparation of the zeolitic copper additive, the dried catalyst is usually calcined in air for about 1-4 hours to decompose organic matter and fix the titanium and/or zirconium in the composition as an inorganic compound. Suitable calcination temperatures are 500° to about 600° C.

The catalyst composition of this invention may be prepared as a preformed mixture of cracking catalyst and additive and the mixture added to the cracking unit as initial fill or as makeup catalyst. It also may be prepared in situ by introduction of the additive to the circulating inventory of cracking catalyst in the cracking unit, this latter method being preferred. The point of introduction into the system may be the same as used for adding makeup cracking catalyst, but it may be at some other suitable place in the unit.

Catalytic Cracking Process

The catalyst is used by incorporating into the circulating catalyst inventory of an FCC unit an amount of the additive catalyst particles. The amount of the additive is selected to be sufficient to reduce the CO and $NO_X$ emissions from thee regenerator stack, and the precise amount required will depend upon a number of factors including the amount of CO oxidation catalyst used, the composition of the cracking feed, the design of the cracking unit and so forth, as is known in the petroleum refining industry. In general terms, the amount of additive particles will be about 0.1 to 30 wt%, and preferably 0.1 to 10 wt% of the circulating catalyst inventory including the additive. A detailed description of the manner in which the additive may be added to the cracking unit is found in Ser. No. 07,433,407, to which reference is made for the description.

Although the above description of this invention is mainly directed to the use in catalytic cracking of the copper-containing additive catalyst these compositions in particulate or other form e.g. monoliths, may also be used for other applications or processes in which exhaust gases that contain noxious oxides of nitrogen are formed. Non-limiting examples include the treatment of exhaust gases from stationary power plants, from incinerators, from automotive vehicles, and from certain chemical plants. Depending on the composition of the exhaust gas, the catalyst may be used alone to reduce the $NO_x$ content of the exhaust, or it may be used with co-fed ammonia, CO or hydrocarbon, to effect selective catalytic reduction (SCR). Further description of useful shapes of the catalyst and their application is found in U.S. Pat. No. 4,798,813 to Kato et al. to which reference is made for a description of such shapes.

Examples 1 to 8, immediately following, illustrate the preparation of MCM-22 catalyst. Examples 9 to 14 illustrate the effect of the additive catalysts in reducing $NO_x$.

EXAMPLE 1

One part of sodium aluminate (43.5% $Al_2O_3$, 32.2% $Na_2O$, 25.6% $H_2O$) was dissolved in a solution containing 1 part of 50% NaOH solution and 103.13 parts $H_2O$. To this was added 4.50 parts hexamethyleneimine. The resulting solution was added to 8.55 parts of Ultrasil, a precipitated, spray-dried silica (about 90% $SiO_2$).

The reaction mixture had the following composition, in mole ratios:

| | |
|---|---|
| $SiO_2/Al_2O_3$ = | 30.0 |
| $OH^-/SiO_2$ = | 0.18 |
| $H_2O/SiO_2$ = | 44.9 |
| $Na/SiO_2$ = | 0.18 |
| $R/SiO_2$ = | 0.35 | where R is hexamethyleneimine.

The mixture was crystallized in a stainless steel reactor, with stirring, at 150° C. for 7 days. The crystalline product was filtered, washed with water and dried at 120° C. After a 20 hour calcination at 538° C., the X-ray diffraction pattern contained the major lines listed in Table 5 below.

TABLE 5

| Degrees 2-Theta | Interplanar d-Spacing (A) | $I/I_o$ |
|---|---|---|
| 2.80 | 31.55 | 25 |
| 4.02 | 21.98 | 10 |
| 7.10 | 12.45 | 96 |
| 7.95 | 11.12 | 47 |
| 10.00 | 8.85 | 51 |
| 12.90 | 6.86 | 11 |
| 14.34 | 6.18 | 42 |
| 14.72 | 6.02 | 15 |
| 15.90 | 5.57 | 20 |
| 17.81 | 4.98 | 5 |
| 20.20 | 4.40 | 20 |
| 20.91 | 4.25 | 5 |
| 21.59 | 4.12 | 20 |
| 21.92 | 4.06 | 13 |
| 22.67 | 3.92 | 30 |
| 23.70 | 3.75 | 13 |
| 24.97 | 3.57 | 15 |
| 25.01 | 3.56 | 20 |
| 26.00 | 3.43 | 100 |
| 26.69 | 3.31 | 14 |
| 27.75 | 3.21 | 15 |

TABLE 5-continued

| Degrees 2-Theta | Interplanar d-Spacing (A) | $I/I_o$ |
|---|---|---|
| 28.52 | 3.13 | 10 |
| 29.01 | 3.08 | 5 |
| 29.71 | 3.01 | 5 |
| 31.61 | 2.830 | 5 |
| 32.21 | 2.779 | 5 |
| 33.35 | 2.687 | 5 |
| 34.61 | 2.592 | 5 |

The sorption capacities of the calcined material were measured to be:

| | |
|---|---|
| $H_2O$ | 15.2 wt. % |
| Cyclohexane | 14.6 wt. % |
| n-Hexane | 16.7 wt. % |

The surface area of the calcined crystalline material was measured to be 494 m²/g.

The chemical composition of the uncalcined material was determined to be as follows:

| Component | Wt. % |
|---|---|
| $SiO_2$ | 66.9 |
| $Al_2O_3$ | 5.40 |
| Na | 0.03 |
| N | 2.27 |
| Ash | 76.3 |
| $SiO_2/Al_2O_3$, mole ratio | 21.1 |

A portion of the calcined crystalline product was tested in the Alpha Test and was found to have an Alpha Value of 224.

EXAMPLES 2-4

Three separate synthesis reaction mixtures were prepared with compositions indicated in Table 6 below. The mixtures were prepared with sodium aluminate, sodium hydroxide, Ultrasil, hexamethyleneimine (R) and water. The mixtures were maintained at 150° C., 143° C. and 150° C., respectively, for 7, 8 and 6 days respectively in stainless steel autoclaves at autogenous pressure. Solids were separated from any unreacted components by filtration and then water washed, followed by drying at 120° C. The product crystals were subjected to X-ray diffraction, sorption, surface area and chemical analyses. The results of the sorption, surface area and chemical analyses are presented in Table 6. The sorption and surface area measurements were of the calcined product.

TABLE 6

| Example | 10 | 11 | 12 |
|---|---|---|---|
| Synthesis Mixture, mole ratios | | | |
| $SiO_2/Al_2O_3$ | 30.0 | 30.0 | 30.0 |
| $OH^-/SiO_2$ | 0.18 | 0.18 | 0.18 |
| $H_2O/SiO_2$ | 19.4 | 19.4 | 44.9 |
| $Na/SiO_2$ | 0.18 | 0.18 | 0.18 |
| $R/SiO_2$ | 0.35 | 0.35 | 0.35 |
| Product Composition, Wt. % | | | |
| $SiO_2$ | 64.3 | 68.5 | 74.5 |
| $Al_2O_3$ | 4.85 | 5.58 | 4.87 |
| Na | 0.08 | 0.05 | 0.01 |
| N | 2.40 | 2.33 | 2.12 |
| Ash | 77.1 | 77.3 | 78.2 |
| $SiO_2/Al_2O_3$, molar | 22.5 | 20.9 | 26.0 |
| Adsorption, Wt. % | | | |
| $H_2O$ | 14.9 | 13.6 | 14.6 |

TABLE 6-continued

| Example | 10 | 11 | 12 |
|---|---|---|---|
| Cyclohexane | 12.5 | 12.2 | 13.6 |
| n-Hexane | 14.6 | 16.2 | 19.0 |
| Surface Area, m$^2$/g | 481 | 492 | 487 |

Quantities of the calcined (538° C. for 3 hours) crystalline silicate products of Examples 10, 11 and 12 were tested in the Alpha Test and found to have Alpha Values of 227, 180 and 187, respectively.

EXAMPLE 5

To demonstrate a further preparation of the zeolite MCM-22, 4.49 parts of hexamethyleneimine was added to a solution containing 1 part of sodium aluminate, 1 part of 50% NaOH solution and 44.19 parts of H$_2$O. To the combined solution were added 8.54 parts of Ultrasil silica. The mixture was crystallized with agitation at 145° C. for 59 hours and the resultant product was water washed and dried at 120° C.

Product chemical composition, surface area and adsorption analyses results were as set forth in Table 7. The surface area and sorption analyses were performed on the calcined sample, the chemical composition on the uncalcined material.

TABLE 7

| Product Composition | |
|---|---|
| C | 12.1 wt. % |
| N | 1.98 wt. % |
| Na | 640 ppm |
| Al$_2$O$_3$ | 5.0 wt. % |
| SiO$_2$ | 74.9 wt. % |
| SiO$_2$/Al$_2$O$_3$, mole ratio | 25.4 |
| Adsorption, wt. % | |
| Cyclohexane | 9.1 |
| N-Hexane | 14.9 |
| H$_2$O | 16.8 |
| Surface Area, m$^2$/g | 479 |

EXAMPLE 6

Twenty-five grams of solid crystal product of Example 14 were calcined in a flowing nitrogen atmospheres at 538° C. for 5 hours, followed by purging with 5% oxygen gas (balance N$_2$) for another 16 hours at 538° C.

Individual 3g samples of the calcined material were ion-exchanged with 100 ml of 0.1N TEABr, TPABr and LaCl$_3$ solution separately. Each exchange was carried out at ambient temperature for 24 hours and repeated three times. The exchanged samples were collected by filtration, water-washed to be halide-free and dried. The compositions of the exchanged samples are tabulated below demonstrating the exchange capacity of the present crystalline silicate for different ions.

| Exchange Ions Ionic Composition, wt. % | TEA | TPA | La |
|---|---|---|---|
| Na | 0.095 | 0.089 | 0.063 |
| N | 0.30 | 0.38 | 0.03 |
| C | 2.89 | 3.63 | — |
| La | — | — | 1.04 |

The La-exchanged sample was sized to 14 to 25 mesh and then calcined in air at 538° C. for 3 hours. The calcined material had an Alpha Value of 173.

The calcined sample of the La-exchanged material was severely steamed at 649° C. in 100% steam for 2 hours. The steamed sample had an Alpha Value of 22, demonstrating that the zeolite has very good stability under severe hydrothermal treatment.

EXAMPLE 7

This example illustrates the preparation of the zeolite MCM-22 where X in the general formula above is boron. Boric acid, 2.59 parts, was added to a solution containing 1 part of 45% KOH solution and 42.96 parts H$_2$O. To this was added 8.56 parts of Ultrasil silica, and the mixture was thoroughly homogenized. A 3.88 parts quantity of hexamethyleneimine was added to the mixture.

The reaction mixture had the following composition in mole ratios:

| | |
|---|---|
| SiO$_2$/B$_2$O$_3$ = | 6.1 |
| OH$^-$/SiO$_2$ = | 0.06 |
| H$_2$O/SiO$_2$ = | 19.0 |
| K/SiO$_2$ = | 0.06 |
| R/SiO$_2$ = | 0.30 | where R is hexamethyleneimine.

The mixture was crystallized in a stainless steel reactor, with agitation, at 150° C. for 8 days. The crystalline product was filtered, washed with water and dried at 120° C. A portion of the product was calcined for 6 hours at 540° C. and found to have the following sorption capacities:

| | |
|---|---|
| H$_2$O (12 Torr) | 11.7 wt. % |
| Cyclohexane (40 Torr) | 7.5 wt. % |
| n-Hexane (40 Torr) | 11.4 wt. % |

The surface area of the calcined crystalline material was measured (BET) to be 405m$^2$/g.

The chemical composition of the uncalcined material was determined to be as follows:

| | |
|---|---|
| N | 1.94 wt. % |
| Na | 175 ppm |
| K | 0.60 wt. % |
| Boron | 1.04 wt. % |
| Al$_2$O$_3$ | 920 ppm |
| SiO$_2$ | 75.9 wt. % |
| Ash | 74.11 wt. % |
| SiO$_2$/Al$_2$O$_3$, molar ratio | 1406 |
| SiO$_2$/(Al + B)$_2$O$_3$, molar ratio | 25.8 |

A portion of the calcined crystalline product of was treated with NH$_4$Cl and again calcined. The final crystalline product was tested in the Alpha Test and found to have an Alpha Value of 1.

EXAMPLE 8

This example illustrates another preparation of the zeolite in which X of the general formula above is boron. Boric acid, 2.23 parts, was added to a solution of 1 part of 50% NaOH solution and 73.89 parts H$_2$O. To this solution was added 15.29 parts of HiSil silica followed by 6.69 parts of hexamethyleneimine. The reaction mixture had the following composition in mole ratios:

| | |
|---|---|
| SiO$_2$/B$_2$O$_3$ | 12.3 |
| OH$^-$/SiO$_2$ | 0.056 |
| H$_2$O/SiO$_2$ | 18.6 |
| K/SiO$_2$ | 0.056 |

| | -continued | |
|---|---|---|
| | R/SiO$_2$ | 0.30 | where R is hexamethyleneimine.

The mixture was crystallized in a stainless steel reactor, with agitation, at 300° C. for 9 days. The crystalline product was filtered, washed with water and dried at 120° C. The sorption capacities of the calcined material (6 hours at 540° C.) were measured:

| | |
|---|---|
| H$_2$O (12 Torr) | 14.4 wt. % |
| Cyclohexane (40 Torr) | 4.6 wt. % |
| n-Hexane (40 Torr) | 14.0 wt. % |

The surface area of the calcined crystalline material was measured to be 438m$^2$/g.

The chemical composition of the uncalcined material was determined to be as follows:

| Component | Wt. % |
|---|---|
| N | 2.48 |
| Na | 0.06 |
| Boron | 0.83 |
| Al2O3 | 0.50 |
| SiO2 | 73.4 |
| SiO2/Al2O3, molar ratio | 249 |
| SiO2/(Al + B)2O3, molar ratio | 28.2 |

A portion of the calcined crystalline product was tested in the Alpha Test and found to have an Alpha Value of 5.

EXAMPLES 9-14

An additive was prepared by impregnating a sample of MCM-22 (silica:alumina ratio 26:1) with an aqueous mixture of copper nitrate, cerium ammonium nitrate, and titanium methoxide in HCl. It was then calcined at 500° C. for 6 hours. This material will be referred to as Additive A. Subsequent elemental analysis revealed 2.33% copper, 0.84% cerium and 4.65% titanium in this additive.

Another additive was prepared in the same manner by ball milling the same MCM-22 for 16 hours, incorporating 40% into a SiO$_2$/Al$_2$O$_3$ (87/13) matrix and spray drying. This was slurried twice with deionized water and decanted, column exchanged with 5 ml of 1N NH$_4$NO$_3$/gram of catalyst, washed with 10 ml of distilled/redistilled water/gram of catalyst and dried at 250° F. and calcined for 2 hours at 1200° F. in static air. Following impregnation, elemental analysis showed 2.05% copper, 2.07% cerium and 4.87% titanium. It was designated Additive B.

A portion of each additive was steamed at 760° C. for 4 hours at one atmosphere in 100% steam.

Each of the additives above and their steamed counterparts was mixed at 5% by weight with a spent FCC catalyst containing 0.935% carbon and 0.0275% nitrogen. This was placed in a quartz reactor equipped with a fritted disk to support the catalyst and air (diluted with nitrogen to give 3% oxygen by volume) was passed in an upflow manner through the catalyst bed at a flow rate of 400 cm$^3$.min.$^{-1}$ and a temperature of 700° C. The effluent gas was analyzed for oxides of nitrogen (NO$_x$) using a chemiluminescence detector (Beckman Model 951A NO/NO$_x$ Analyzer). The results of these measurements are tabulated below:

| Example | Additive | Peak NO$_x$ conc. (ppm) | % NOx Reduction |
|---|---|---|---|
| 9 | None | 754 | 0 |
| 10 | A | 76 | 90 |
| 11 | A (steamed) | 291 | 61 |
| 12 | None | 752 | 0 |
| 13 | B | 90 | 88 |
| 14 | B (steamed) | 366 | 51 |

These results show that MCM-22 is an active catalyst for NO$_x$ reduction, both unbound and when incorporated in a matrix such as silica-alumina.

We claim:

1. In a catalytic cracking process in which a hydrocarbon feed is cracked in a cracking zone in the absence of added hydrogen and in the presence of a circulating inventory of solid acidic cracking catalyst which acquires a deposit of coke that contains chemically bound nitrogen while the cracking catalyst is in the cracking zone, the coked catalyst being circulated to a regeneration zone to convert the coked catalyst to a regenerated catalyst with the formation of a flue gas comprising nitrogen oxides, the improvement comprising:
incorporating into the circulating catalyst inventory an amount of additive particles comprising a synthetic porous crystalline material containing copper metal or cations, the synthetic crystalline material being characterized by an X-ray diffraction pattern including values substantially as set out in Table 1 of the specification, to reduce the content of nitrogen oxides in the flue gas.

2. A process according to claim 1 in which the synthetic porous crystalline material is characterized by an X-ray diffraction pattern including values substantially as set forth in Table 2 of the specification.

3. A process according to claim 1 in which the synthetic porous crystalline material is characterized by an X-ray diffraction pattern including values substantially as set forth in Table 3 of the specification.

4. A process according to claim 1 in which the synthetic porous crystalline material is characterized by an X-ray diffraction pattern including values substantially as set forth in Table 4 of the specification.

5. A process according to claim 1 in which the synthetic porous crystalline material has a composition comprising the molar relationship

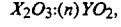
$$X_2O_3:(n)YO_2,$$

wherein n is at least about 10, X is a trivalent element and Y is a tetravalent element.

6. A process according to claim 1 in which the synthetic porous crystalline material has the structure of MCM-22.

7. A process according to claim 1 in which the additive catalyst includes copper metal or cations in an amount equivalent to at least one half mole of CuO for ac mole of Al$_2$O$_3$ in the crystalline material.

8. A process according to claim 1 in which the amount of additive particles is from 0.1 to 30 weight percent of said circulating inventory including additive.

9. A process according to claim 8 in which the amount of additive particles is from 0.1 to 10 weight percent of said circulating inventory including additive.

10. A process according to claim 1 in which the amount of additive particles contain a steam stabilizing amount of an inorganic titanium or zirconium compound.

11. A process according to claim 1 in which the crystalline material containing copper metal or cations is included in a binder.

12. A process according to claim 1 in which the additive particles comprise cations of a rare earth metal.

13. A process according to claim 12 in which the rare earth metal is cerium or yttrium.

14. A process according to claim 12 in which the amount of rare earth cations in the additive particles is from 0.1 to 10.0 weight percent of the additive particles.

* * * * *